United States Patent
Burke et al.

(10) Patent No.: US 9,956,640 B2
(45) Date of Patent: May 1, 2018

(54) METHODS FOR PRINTING THREE-DIMENSIONAL OBJECTS

(71) Applicant: Digital Alloys Incorporated, Burlington, MA (US)

(72) Inventors: Paul Burke, Framingham, MA (US); Mateo Pena Doll, Boston, MA (US)

(73) Assignee: DIGITAL ALLOYS INCORPORATION, Burlington, MA (US)

( * ) Notice: Subject to any disclaimer, the term of this patent is extended or adjusted under 35 U.S.C. 154(b) by 0 days. days.

(21) Appl. No.: 15/619,401

(22) Filed: Jun. 9, 2017

(65) Prior Publication Data

US 2017/0282283 A1  Oct. 5, 2017

Related U.S. Application Data

(63) Continuation of application No. PCT/US2015/065003, filed on Dec. 10, 2015.
(Continued)

(51) Int. Cl.
*B29C 64/386* (2017.01)
*B23K 11/00* (2006.01)
(Continued)

(52) U.S. Cl.
CPC ...... *B23K 11/0013* (2013.01); *B23K 11/0006* (2013.01); *B23K 11/257* (2013.01);
(Continued)

(58) Field of Classification Search
CPC . B29C 67/0088; B29C 67/0074; B33Y 30/00; B33Y 50/02
See application file for complete search history.

(56) References Cited

U.S. PATENT DOCUMENTS

| 3,555,235 A | 1/1971 | Darrow et al. |
| 4,228,338 A | 10/1980 | Cook et al. |

(Continued)

FOREIGN PATENT DOCUMENTS

| JP | S5853382 A | 3/1983 |
| JP | S6021385 A | 2/1985 |

OTHER PUBLICATIONS

Co-pending U.S. Appl. No. 15/434,512, filed Feb. 16, 2017.
(Continued)

*Primary Examiner* — Jacob T Minskey
*Assistant Examiner* — Melody Tsui
(74) *Attorney, Agent, or Firm* — Wilson Sonsini Goodrich & Rosati

(57) ABSTRACT

The present disclosure provides a method for printing at least a portion of a three-dimensional (3D) object adjacent to a support. The method may comprise receiving in computer memory a computational representation of the 3D object. Subsequent to receiving the computational representation of the 3D object, at least one feedstock may be directed through a feeder towards the support. Upon directing the at least one feedstock through the feeder, electrical current may be flowed through the at least one feedstock and into the support. The at least one feedstock may be subjected to Joule heating upon flow of electrical current through the at least one feedstock, which may be sufficient to melt at least a portion of the at least one feedstock. The at least the portion of the at least one feedstock may be deposited adjacent to the support in accordance with the computational representation of the 3D object.

23 Claims, 8 Drawing Sheets

Related U.S. Application Data

(60) Provisional application No. 62/091,037, filed on Dec. 12, 2014.

(51) Int. Cl.
   *B23K 11/25* (2006.01)
   *B23K 11/30* (2006.01)
   *B33Y 10/00* (2015.01)
   *B33Y 50/02* (2015.01)

(52) U.S. Cl.
   CPC .......... *B23K 11/309* (2013.01); *B33Y 10/00* (2014.12); *B33Y 50/02* (2014.12)

(56) References Cited

U.S. PATENT DOCUMENTS

| | | | |
|---|---|---|---|
| 4,866,237 A | 9/1989 | Inoue | |
| 6,004,124 A | 12/1999 | Swanson et al. | |
| 6,391,251 B1 | 5/2002 | Keicher et al. | |
| 7,062,849 B2 | 6/2006 | Ohashi et al. | |
| 7,073,561 B1 | 7/2006 | Henn | |
| 7,168,935 B1* | 1/2007 | Taminger | B23K 15/0073 219/121.12 |
| 7,169,337 B2 | 1/2007 | Swanson et al. | |
| 7,754,597 B2 | 7/2010 | Toyoda | |
| 9,440,397 B1 | 9/2016 | Fly | |
| 2005/0017411 A1 | 1/2005 | Yang et al. | |
| 2008/0073330 A1 | 3/2008 | Diedrick et al. | |
| 2011/0240607 A1 | 10/2011 | Stecker et al. | |
| 2014/0242374 A1 | 8/2014 | Strasser et al. | |
| 2014/0374048 A1 | 12/2014 | Kennedy et al. | |
| 2015/0021379 A1* | 1/2015 | Albrecht | B05B 5/001 228/256 |
| 2015/0108095 A1 | 4/2015 | Kruer et al. | |
| 2015/0145169 A1* | 5/2015 | Liu | B29C 67/0092 264/308 |
| 2015/0239178 A1 | 8/2015 | Armstrong | |
| 2016/0031159 A1 | 2/2016 | Church et al. | |
| 2016/0052208 A1 | 2/2016 | Debora et al. | |
| 2016/0057250 A1 | 2/2016 | Sakai et al. | |
| 2016/0096318 A1* | 4/2016 | Bickel | B29C 67/0051 264/40.1 |
| 2016/0167156 A1 | 6/2016 | Burke et al. | |
| 2016/0193703 A1 | 7/2016 | Kempers et al. | |
| 2017/0341306 A1 | 11/2017 | Burke et al. | |

OTHER PUBLICATIONS

Co-pending U.S. Appl. No. 15/636,591, filed Jun. 28, 2017.
International Search Report and Written Opinion dated Mar. 9, 2016 for International Application No. PCT/US2015/065003.
Sames et al., The metallurgy and processing science of metal additive manufacturing, International Materials Reviews, 61: 315-360 (2016).
Office Action dated Nov. 17, 2017 for U.S. Appl. No. 15/636,591.
Office Action dated Aug. 21, 2017 for U.S. Appl. No. 15/636,591.
Notice of Allowance dated Jan. 12, 2018 for U.S. Appl. No. 15/636,591.
Office Action dated Jan. 3, 2018 for U.S. Appl. No. 14/965,275.

\* cited by examiner

METHODS FOR PRINTING THREE-DIMENSIONAL OBJECTS

CROSS-REFERENCE

The present application is a continuation of International Application No. PCT/US2015/065003, filed Dec. 10, 2015, which claims the benefit of U.S. Provisional Patent Application No. 62/091,037, filed Dec. 12, 2014, each of which is entirely incorporated herein by reference.

TECHNICAL FIELD

In various embodiments, the present invention relates to additive manufacturing techniques such as three-dimensional (3D) printing, and in particular to the additive manufacturing of metallic objects.

BACKGROUND

Additive manufacturing techniques such as 3D printing are rapidly being adopted as useful techniques for a host of different applications, including rapid prototyping and the fabrication of specialty components. To date, most additive manufacturing processes have utilized polymeric materials, which are melted, layer-by-layer, into specified patterns to form 3D objects. The additive manufacturing of metallic objects presented additional challenges, but techniques have been more recently developed to address these challenges.

Existing technologies for the additive manufacture of metal structures may generally be classified in three categories: laser sintering, adhesive bonding followed by sintering, and molten metal deposition. The two sintering technologies use a bed of metal powder in the build area, and the powder particles are selectively joined to one another to form the desired pattern. When one layer is completed, more metal powder is spread over the first layer, and powder particles are joined to the previous layer in the pattern required for that layer. The process continues with fresh powder spread over the entire surface of the build area and then selectively joined, building the desired structure layer by layer. The finished part is retrieved from inside the powder bed, and the powder is then emptied from the build area to begin the next part.

However, the use of metal powder as a raw material can be problematic for several reasons. Metal powder is expensive to produce, and generally is more expensive than a wire made from the same material for the same volume of material. Metal powders are difficult and dangerous to handle. For example, metal powder that is spilled may form dust in the air that is dangerous to inhale, and such dust may even be an explosion risk. In addition, the amount of powder required for conventional additive manufacturing technologies is many times greater than that required to make the part, as the entire build area must be filled with powder. This increases the cost of the process and leads to attrition and waste of powder, which may not be readily reused. Conventional powder-based processes are also very slow because the spreading of concurrent layers of powder typically must be done precisely to the required layer thickness and must be done across the entire build area for each layer.

Laser sintering uses a high power laser as the source of heat to fuse particles. Lasers have many safety risks, especially at the powers required for fusing metals. Using lasers as a source of heat causes issues because the particles must be heated top down to add enough heat to fuse them to the previous layer. Such top-down heating requires much more heat than would be needed if the heat was applied directly to the joining surfaces, which slows down the overall process and causes the excess heat to be dissipated into the powder bed. Because of this, there is the danger of unwanted sintering particles in the area around that which the laser is heating. Therefore, the process requires the use of metals and alloys that have poor heat conduction.

Adhesive bonding uses glue to join adjacent powder particles instead of directly fusing the particles by laser energy, but the process is otherwise similar. Glue is selectively sprayed to form a pattern, and powder is added layer by layer to form the structure. To make a mechanically sound metal part, the structure generally must be removed from the powder bed and placed in a furnace to sinter the bonded metal powders. The sintering multiplies the complexity of the process and well as the time required to produce parts.

In molten-metal deposition techniques, heat to liquefy the metal is derived from plasma or electric arc. The molten metal is then sprayed in the pattern desired to form a structure by building layers as the metal cools. The resolution achieved by spraying metal is generally poor compared to other processes, to the extent that hybrid machines have been developed to deposit metal, allow it to cool, and then use a milling tool to machine it to size. The speed of the process is slow because sufficient time must be allowed to cool the underlying layer before it can be built upon, as the heat generated by the plasma or electric arc are very high. It is further slowed by the machining process if good resolution is required.

In view of the foregoing, there is a need for improved additive manufacturing techniques for the fabrication of metallic parts that do not utilize metal powders as raw materials, do not generate excessive heat, and do not require time-consuming and uneconomical sintering steps for solidification.

SUMMARY

In accordance with various embodiments of the present invention, metal objects are fabricated layer by layer in a controlled manner utilizing metal wire as feedstock, enabling the manufacture of 3D structures. Embodiments of the invention only utilize as much feedstock as required to form the object being fabricated, eliminating most (if not all) of the waste and/or recovery processes associated with powder-based techniques. The metallic wire feedstock is more easily handled and enables faster fabrication, as it is deployed only at the exact points where the solid structure is being fabricated. The wire is heated upon contact with the fabrication platform or a previous layer of the structure being fabricated via a pulse of electric current, forming a molten droplet (or "particle") at the point of contact. The molten droplets adhere in place, enabling the layer-by-layer fabrication of the part. Advantageously, only the single melting/deposition step is required, obviating the need for separate sintering steps to bond the metal particles together. In addition, current is typically only applied to the wire upon contact with the fabrication platform or a previous layer of the structure being fabricated, thereby minimizing heating of the wire (and the structure being fabricated) and preventing formation of electrical arcs at the wire tip.

Embodiments of the present invention have the advantage that heat is generated at the point of contact between adjacent particles (i.e., between the tip of the wire feedstock and the fabrication platform or a previous layer of the structure being fabricated), exactly where the heat is required for fusion. This allows much lower heat input than that utilized in laser-heating techniques. The lower heat input enables faster overall processing, no risk of unwanted heating of surrounding particles, and the use of many different metals and alloys. It also reduces safety concerns, and the build area typically is maintained at a lower temperature.

Embodiments of the present invention solve the problems inherent to existing approaches by leveraging knowledge of established gas metals arc welding (GMAW), resistive spot welding (RSW), and computer-aided manufacturing (CAM) technologies. Embodiments of the invention utilize inert gas shielding and a fine metal wire electrode as both an electrode and source of metal feedstock (similarly to GMAW), an electric current that heats and melts the feed metal and base metal due to contact resistance (similarly to RSW), and can control the motion of the metal wire electrode/feedstock in three dimensions through a computer-controlled interface, allowing for deposition of material in the desired shape (similarly to CAM). These features enable the production of 3D metal structures using any of a variety of metals and metal alloys with minimal safety concerns at low cost.

In an aspect, embodiments of the invention feature a method of layer-by-layer fabrication of a three-dimensional metallic structure upon an electrically conductive base. A first layer of the structure is formed by depositing a plurality of metal particles onto the base. Each metal particle is deposited by (i) disposing a metal wire in contact with the base, and (ii) passing an electrical current through the metal wire and the base. A portion of the metal wire melts to form the metal particle on the base. One or more subsequent layers of the structure are formed by depositing pluralities of metal particles over the first layer of the structure. Each metal particle is deposited by (i) disposing the metal wire in contact with a previously deposited metal particle, and (ii) passing an electrical current through the metal wire, the previously deposited metal particle, and the base. A portion of the metal wire melts to form the metal particle on the previously deposited metal particle.

Embodiments of the invention may include one or more of the following in any of a variety of combinations. A gas may be flowed over at least a tip of the wire during deposition of the metal particles. The gas may reduce or substantially prevent oxidation of the metal particles during deposition. The gas may increase a cooling rate of the metal particles during deposition. After deposition of each metal particle, a relative position of the metal wire and the base may be changed with one or more mechanical actuators (e.g., stepper motors, solenoids, etc.). The metal wire may include, consist essentially of, or consist of stainless steel, copper, and/or aluminum. A porosity of at least a portion of the structure may be controlled by (i) altering a spacing between adjoining contact points between the metal wire and the base or underlying particles, and/or (ii) altering a magnitude of the current applied between the metal wire and the base. A computational representation of a three-dimensional structure may be stored. Sets of data corresponding to successive layers may be extracted from the computational representation, and each of the forming steps may be performed in accordance with the data. A size of at least one metal particle may be selected by controlling a speed of retraction of the metal wire therefrom (e.g., during and/or after deposition). An outer portion of the metal wire may be removed before the metal wire is melted to form at least one of the metal particles. An amount of metal wire utilized to form the first layer and the one or more subsequent layers of the structure may be tracked and/or stored. The metal particles may be formed in response to heat arising from, at least in part (e.g., substantially entirely due to), contact resistance at the tip of the wire (i.e., resistance resulting from contact between the tip of the wire and an underlying structure, e.g., the base or an underlying particle).

In another aspect, embodiments of the invention feature an apparatus for the layer-by-layer fabrication of a three-dimensional metallic structure from particles formed by melting a metal wire. The apparatus includes or consists essentially of an electrically conductive base for supporting the structure during fabrication, a wire-feeding mechanism for dispensing wire over the base, one or more mechanical actuators for controlling a relative position of the base and the wire-feeding mechanism, a power supply for applying a current between the wire and the base sufficient to cause the wire to release a metal particle (e.g., via heat arising from contact resistance between the wire and an object in contact therewith, e.g., the base), and circuitry for controlling the one or more actuators and the power supply to create the three-dimensional metallic structure on the base from successively released metal particles.

Embodiments of the invention may include one or more of the following in any of a variety of combinations. The circuitry may include or consist essentially of a computer-based controller for controlling the one or more mechanical actuators and/or the power supply. The computer-based controller may include or consist essentially of a computer memory and a 3D rendering module. The computer memory may store a computational representation of a three-dimensional structure. The 3D rendering module may extract sets of data corresponding to successive layers from the computational representation. The controller may cause the mechanical actuators and the power supply to form successive layers deposited metal particles in accordance with the data. Metal wire may be disposed within the wire-feeding mechanism.

In yet another aspect, embodiments of the invention feature a method of layer-by-layer fabrication of a three-dimensional metallic structure upon an electrically conductive base. A sacrificial raft structure is formed by depositing a plurality of metal particles onto the base. Each metal particle is deposited by (i) disposing a first metal wire in contact with the base, and (ii) passing an electrical current through the first metal wire and the base. A portion of the first metal wire melts to form the metal particle on the base. A first layer of the structure is formed by depositing a plurality of metal particles onto the sacrificial raft structure. Each metal particle is deposited by (i) disposing a second metal wire in contact with the sacrificial raft structure, and (ii) passing an electrical current through the second metal wire, the sacrificial raft structure, and the base. A portion of the second metal wire melts to form the metal particle on the sacrificial raft structure. One or more subsequent layers of the structure are formed by depositing pluralities of metal particles over the first layer of the structure. Each metal particle is deposited by (i) disposing the second metal wire in contact with a previously deposited metal particle, and (ii) passing an electrical current through the second metal wire, the previously deposited metal particle, the sacrificial raft structure, and the base. A portion of the second metal wire melts to form the metal particle on the previously deposited metal particle.

Embodiments of the invention may include one or more of the following in any of a variety of combinations. The density and/or the porosity of the sacrificial raft structure may be less than that of the structure. The sacrificial raft structure may define one or more openings therethrough.

The sacrificial raft structure may include, consist essentially of, or consist of a plurality of layers. A thickness of at least one of the layers of the sacrificial raft structure may be greater than a thickness of at least one of the layers of the structure. A thickness of at least one of the layers of the sacrificial raft structure may be greater than a thickness of all of the layers of the structure. A thickness of a bottommost layer of the sacrificial raft structure (i.e., the layer of the sacrificial raft structure directly in contact with the base) may be greater than a thickness of at least one of, or even all of, the layers of the structure. After fabrication of the structure, the sacrificial raft structure may be removed from the base, and at least a portion of the structure may remain on the sacrificial raft structure. After the sacrificial raft structure is removed from the base, the sacrificial raft structure may be separated from the structure. The first and second metal wires may include, consist essentially of, or consist of different materials (e.g., different metals). The first and second metal wires may include, consist essentially of, or consist of the same material (e.g., the same metal). The metal particles may be formed in response to heat arising from, at least in part (e.g., substantially entirely due to), contact resistance at the tip of the wire (i.e., resistance resulting from contact between the tip of the wire and an underlying structure, e.g., the base, the raft, or an underlying particle).

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately" and "substantially" mean±10%, and in some embodiments, ±5%. The term "consists essentially of" means excluding other materials that contribute to function, unless otherwise defined herein. Nonetheless, such other materials may be present, collectively or individually, in trace amounts. For example, a structure consisting essentially of multiple metals will generally include only those metals and only unintentional impurities (which may be metallic or non-metallic) that may be detectable via chemical analysis but do not contribute to function.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
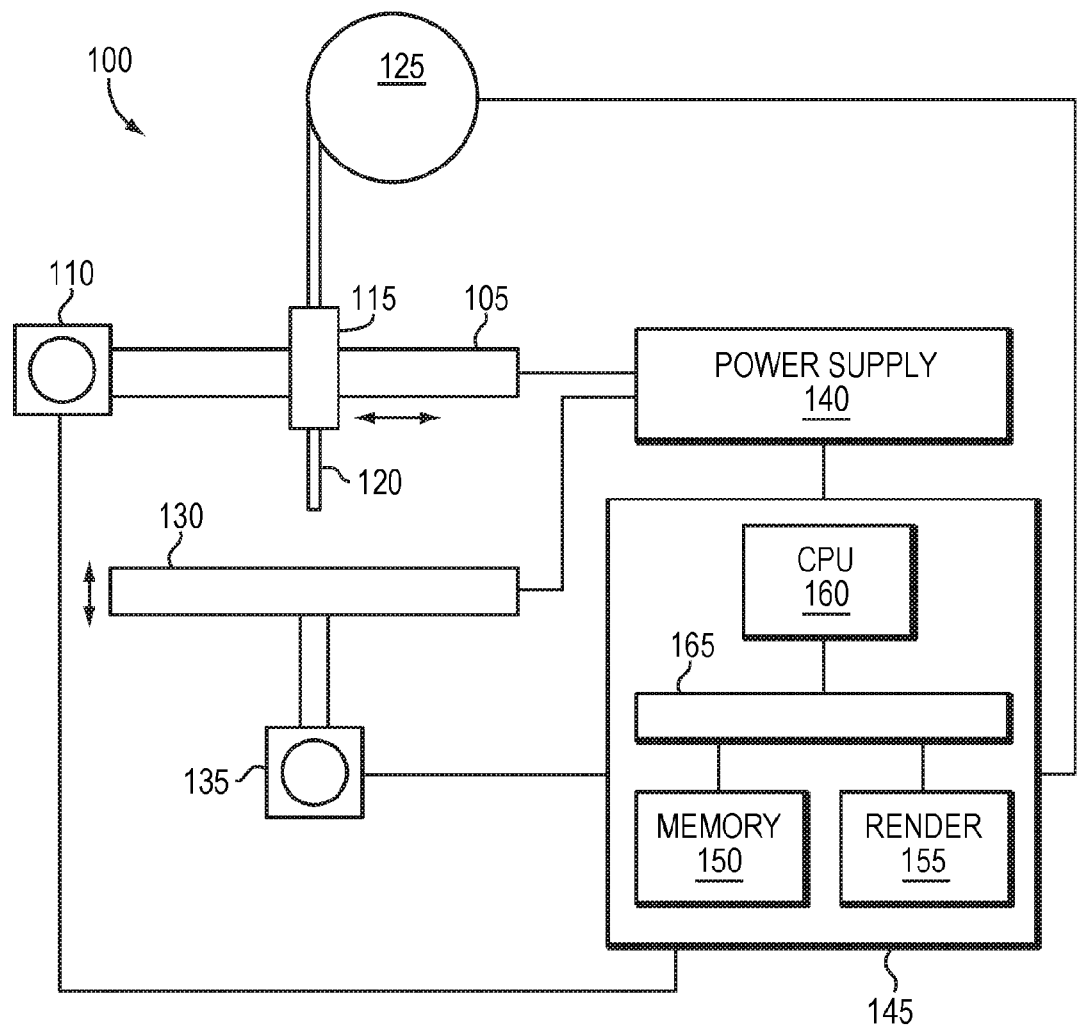
FIG. 1 is a schematic of an additive manufacturing apparatus in accordance with various embodiments of the invention.
Figure 2A:
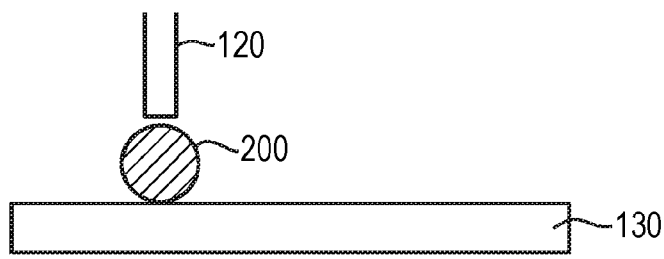
FIGS. 2A-2F are schematics of the deposition of metallic particles during the fabrication of a three-dimensional object in accordance with various embodiments of the invention.
Figure 2B:
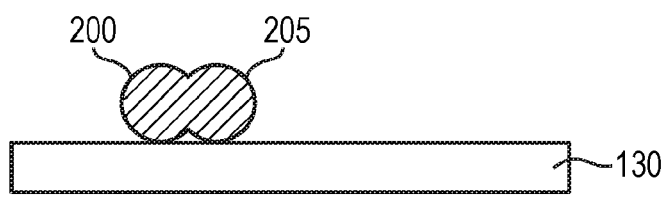
Figure 2C:
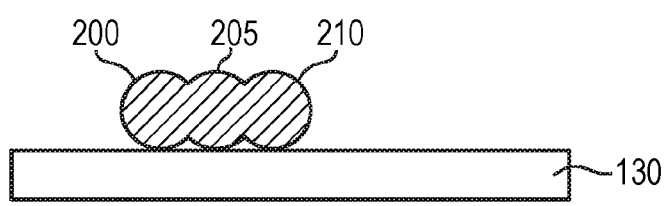
Figure 2D:
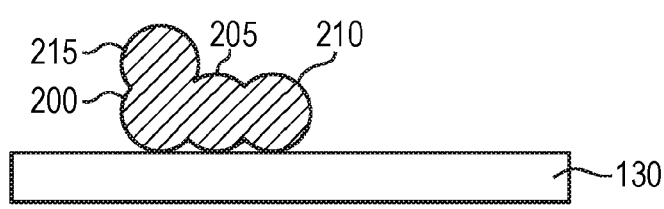
Figure 2E:
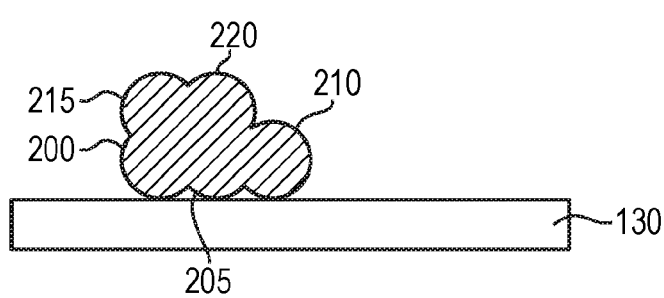
Figure 2F:
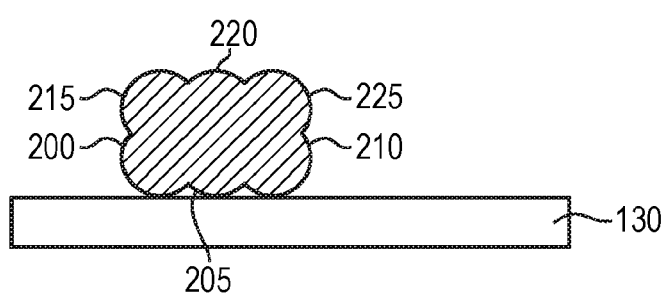

In accordance with embodiments of the invention, 3D metal structures may be fabricated layer-by-layer using an apparatus 100, as shown in FIG. 1. Apparatus 100 includes a mechanical gantry 105 capable of motion in one or more of five or six axes of control (e.g., one or more of the XYZ planes) via one or more actuators 110 (e.g., motors such as stepper motors). As shown, apparatus 100 also includes a wire feeder 115 that positions a metal wire 120 inside the apparatus, provides an electrical connection to the metal wire 120, and continuously feeds metal wire 120 from a source 125 (e.g., a spool) into the apparatus. A baseplate 130 is also typically positioned inside the apparatus and provides an electrical connection; the vertical motion of the baseplate 130 may be controlled via an actuator 135 (e.g., a motor such as a stepper motor). An electric power supply 140 connects to the metal wire 120 and the baseplate 130, enabling electrical connection therebetween. The motion of the gantry 105 and the motion of the wire feeder 115 are controlled by a controller 145. The application of electric current from the power supply 140, as well as the power level and duration of the current, is controlled by the controller 145.

The computer-based controller 145 in accordance with embodiments of the invention may include, for example, a computer memory 150 and a 3D rendering module 155. Computational representations of 3D structures may be stored in the computer memory 150, and the 3D rendering module 155 may extract sets of data corresponding to successive layers of a desired 3D structure from the computational representation. The controller 145 may control the mechanical actuators 110, 135, wire-feeding mechanism 115, and power supply 140 to form successive layers deposited metal particles in accordance with the data.

The computer-based control system (or "controller") 145 in accordance with embodiments of the present invention may include or consist essentially of a general-purpose computing device in the form of a computer including a processing unit (or "computer processor") 160, the system memory 150, and a system bus 165 that couples various system components including the system memory 150 to the processing unit 160. Computers typically include a variety of computer-readable media that can form part of the system memory 150 and be read by the processing unit 160. By way of example, and not limitation, computer readable media may include computer storage media and/or communication media. The system memory 150 may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit 160. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

Any suitable programming language may be used to implement without undue experimentation the functions described herein. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of systems and techniques of the invention. Rather, any number of different programming languages may be utilized as is necessary or desirable.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit 160 that executes commands and instructions may be a general-purpose computer processor, but may utilize any of a wide variety of other technologies including special-purpose hardware, a microcomputer, minicomputer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of embodiments of the invention.

Embodiments of the invention form metal structures via metal particles formed at the molten tip of a metal wire, as shown in FIGS. 2A-2F. As shown, the formation of the desired 3D structure typically begins with the deposition of a single particle 200 melted from the wire 120 onto the baseplate 130. The particle 200 and subsequent particles may have any morphology but may be considered to be substantially spherical. Additional particles 205, 210 are deposited one by one adjacent to previously deposited particles, and the heat from the formation of each new particle partially melts the adjacent particles and fuses them together. Once all of the particles that need to be adjacent to one another on a single layer for the desired structure have been deposited, deposition of particles 215, 220, 225 begins one by one on top of the previous layer of fused particles 200, 205, 210. Deposition continues in this manner, layer by layer, until the entire structure is completed. Each layer of the structure may be composed of a different number of particles, depending on the desired shape of the structure, and particles in an overlying layer need not be (but may be, in various embodiments) deposited directly on top of a particle of an underlying layer.

Figure 3:
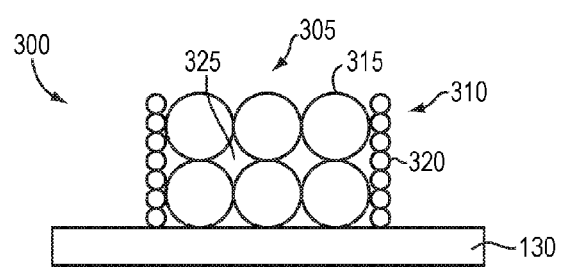
FIG. 3 is a schematic of a printed three-dimensional object having regions of different particle resolutions in accordance with various embodiments of the invention.

The diameter of the particles will typically determine the height of each layer, and as such may at least in part dictate the resolution at which structures may be formed. The diameter of the particles may be changed by changing the diameter of the metal wire 120, as well as the deposition parameters (e.g., current level), and thus the resolution of the structure may be controlled dynamically during the process. In general, higher resolution will increase the time required to form the structure, and lower resolution will decrease it. Therefore, sections of 3D structures may be fabricated with high resolution to hold a tight mechanical tolerance or to be more visually appealing, and others sections may be fabricated at low resolution to increase the speed of deposition, as shown in FIG. 3. FIG. 3 depicts a printed structure 300 composed of a low-resolution portion 305 at least partially surrounded by a high-resolution portion 310. As shown, the low-resolution portion 305 includes or consists essentially of multiple larger particles 315, while high-resolution portion 310 includes or consists essentially of multiple smaller particles 320. The portions 305, 310 may include pores 325 between particles that result from empty space remaining between particles during melting thereof.

Figure 4A:
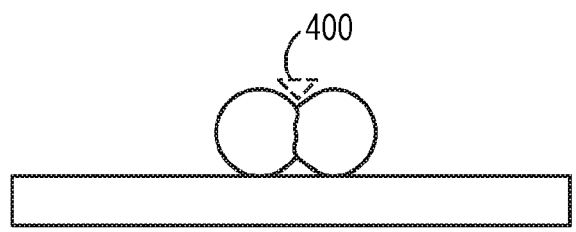
FIG. 4A is a schematic of particles printed with low porosity in accordance with various embodiments of the invention.
Figure 4B:
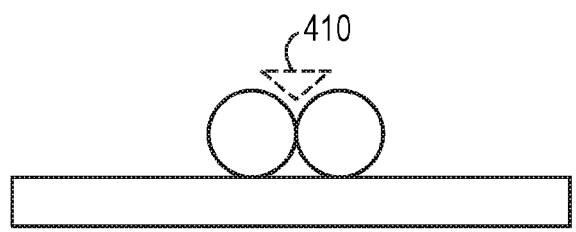
FIG. 4B is a schematic of particles printed with high porosity in accordance with various embodiments of the invention.

The porosity of the fabricated 3D structure may be determined, at least in part, by the spacing and/or extent of fusion between adjacent particles, as shown in FIGS. 4A and 4B. FIG. 4A depicts two particles fused closely together, resulting in a smaller porosity signified by smaller porous region 400 (which may, in a completed part, be at least a portion of a pore therewithin), and FIG. 4B depicts two particles fused together to a lesser extent, resulting in higher porosity signified by a larger porous region 410. Deposition parameters may be varied to determine the degree of fusion between particles, mainly through the amount of heat generated during deposition. If heat is increased, fusion between particles will be greater, and porosity will generally be lower. If enough heat is generated, the resulting structure may have substantially no porosity, which may be preferred to achieve specific mechanical properties. Conversely, less heat will cause less fusion, and porosity will be higher. A more porous structure will typically have a lower weight than a fully dense structure. Since the amount of heat may be controlled dynamically during deposition, sections of the 3D structure may be intentionally made more porous than other sections. For example, a porous filter may be contained in an internal passage of a larger 3D structure. In general, the application of less heat will require less time, so the speed of deposition may be increased if porosity is desired or may be tolerated in sections of the structure. Materials with high porosity typically have low tensile strength but may achieve good compressive strength. Structures may be designed so that areas in compressive loading may be produced with some porosity, leading to faster deposition speed, and also lower weight of the finished structure.

In accordance with embodiments of the present invention, metal particles are formed by melting the tip of the metal wire 120 with electric current. The wire 120 may have a substantially circular cross-section, but in other embodiments the wire 120 has a cross-section that is substantially rectangular, square, or ovular. The diameter (or other lateral cross-sectional dimension) of the metal wire 120 may be chosen based on the desired properties of deposition, but generally may be between approximately 0.1 mm and approximately 1 mm. The metal wire 120 is one electrode, and the metallic baseplate 130 of the apparatus 100 is the other electrode, as shown in FIG. 1. When the wire 120 is in physical contact with the baseplate 130, the two are also in electrical contact. There is an electrical resistance between the wire 120 and baseplate 130 (i.e., contact resistance) due to the small surface area of the fine wire 120 and the microscopic imperfections on the surface of the baseplate 130 and the tip of the wire 120. The contact resistance between the wire 120 and baseplate 130 is the highest electrical resistance experienced by an electric current that is passed between the two electrodes (i.e., the wire 120 and baseplate 130), and the local area at the contact point is heated according to Equation 1 (i.e., Joule's First Law).

$$Q = I^2 \times R \times t \quad \text{Equation 1}$$

The heat generated (Q) is in excess of the heat required to melt the tip of the wire 120 into a particle and to fuse the particle to adjacent particles. The heat is determined by the amount of current passed (I), the contact resistance between the wire 120 and baseplate 130 (R), and the duration of the application of current (t). (Thus, embodiments of the present invention form particles without use or generation of electrical arcs and/or plasma, but rather utilize contact-resistance-based melting of the wire.) Current and time (I and t) may be controlled during the process via controller 145 and power supply 140, and in various embodiments of the invention, a high current is utilized for a short duration (as opposed to a lower current for a longer duration) to increase the speed of deposition. The required current and duration depends on the desired deposition properties, but these may generally range from approximately 10 Amperes (A) to approximately 1000 A and approximately 0.01 seconds (s) to approximately 1 s. After the first layer of fused particles is completed, the previous layer of particles, which are in electrical contact with the baseplate 130, act as the second electrode. As the process proceeds, one electrode (the metal wire 120) is consumed as metal from the tip of the wire 120 is utilized to form the particle.

The use of a consumable metal wire as an electrode is similar to GMAW, in that the wire feedstock may be stored on large spools and feed continuously to continue the deposition process. Thus, there are many metal and metal alloy wires that are readily available at low cost. The devices and techniques for the mechanical motion of feeding the wire and making electrical contact between the wire and the power supply are also known to those of skill in the art. In order to protect the deposited metal from oxidation, an inert gas (such as Ar) or semi-inert gas (such as $N_2$ or $CO_2$) may be flowed over the area around the metal wire electrode to displace oxygen. For example, gas may be flowed continuously at a rate of, e.g., approximately 0.7 $m^3$/hr during the deposition process when the metal is at high temperature or is molten. Advantageously, gas flow rates may be increased beyond what is required to provide a shielding effect to increase the rate at which deposited metal cools. Cooling rate may also affect the resulting mechanical properties of the metal, and with dynamic control during deposition, sections of the structure may be fabricated with different mechanical properties. For example, a high cooling rate may be used on the surface of a structure to increase hardness and wear resistance, while a slower cooling rate may be used on the interior to maintain ductility and strength.

In accordance with embodiments of the invention, the material for the baseplate electrode 130 is selected for good electrical conductivity and compatibility with the metal that is being deposited. The baseplate 130 is typically non-consumable and thus is not damaged and need not be replaced during normal operation. The baseplate material may be chosen to allow weak adhesion of the deposited metal to it, so that the first layer of deposited metal will hold the structure firmly in place on the baseplate 130 during further deposition. For example, if the deposited metal is steel, copper or aluminum may be appropriate materials for the baseplate 130. Copper and aluminum have a high electrical conductivity, will not alloy with steel and change the composition of the deposited metal, and have good thermal conductivity so heat generated at the deposition area may be quickly conducted away, and there is no danger of melting the baseplate 130. The surface finish of the baseplate 130 may be slightly rough, so that the metal of the first layer melts into the fine surface features (e.g., scratches) of the baseplate 130 and allows for weak adhesion. The surface finish of the baseplate 130 may be chosen to give the appropriate amount of adhesion so the structure is held firmly during deposition, but that a reasonable force may be used to remove the finished structure from the baseplate 130 at the end of deposition. The baseplate 130 may be made easily replaceable so that it may be changed to an appropriate material for the desired deposition metal.

The morphology of the deposited particles may be controlled through the diameter of the metal wire 120, as well as the deposition parameters. The diameter of the deposited particle will typically be roughly the same diameter as the wire 120. The diameter of the particle may be increased by feeding additional wire 120 into the particle while it is still molten. The shape of the top of the particle may be influenced by the retraction of the wire 120 while the particle is still molten, for example, where the top of the particle may be drawn into a peak via wire retraction. If the particle is allowed to partially cool, the wire 120 may be used to push the top of the particle to flatten the particle. These manipulations of the particle morphology may be used to change the porosity of the structure.

Figure 5A:
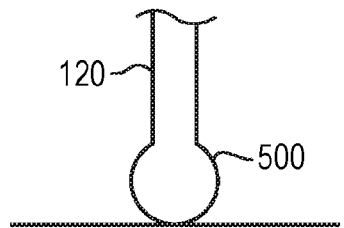
FIGS. 5A-5C schematically depict deposition of a particle from a wire in accordance with various embodiments of the invention.
Figure 5B:
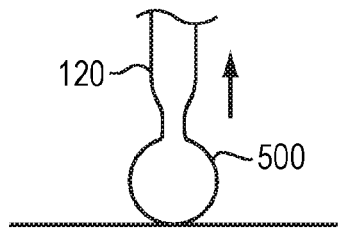
Figure 5C:
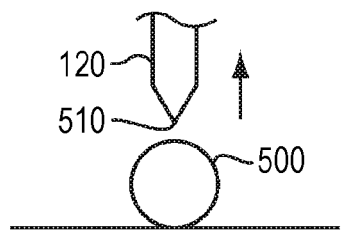
Figure 5D:
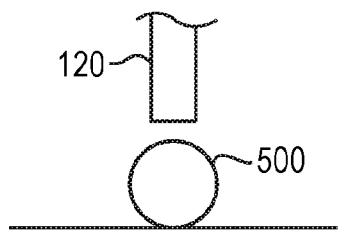
FIGS. 5D-5F schematically depict particles of different sizes deposited via use of different wire-retraction rates in accordance with various embodiments of the invention.
Figure 5E:
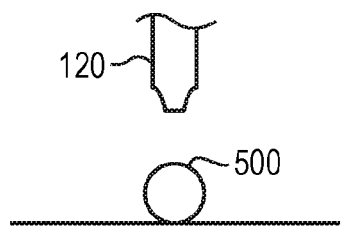
Figure 5F:
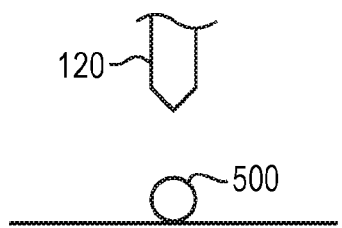

Similarly, retraction of the still molten wire tip from the previously deposited particle may be used to control the morphology of the tip of the wire 120, as illustrated in FIGS. 5A-5C. In various embodiments of the invention, if the wire 120 is retracted quickly, the tip will be drawn into a sharp point. FIG. 5A depicts the initial formation of a particle 500 melting from the tip of wire 120. In FIG. 5B, the wire 120 is retracted from the particle 500, which is still at least partially molten. As shown, the tip of the wire 120 begins to neck down, decreasing its diameter. FIG. 5C illustrates the sharp tip 510 of the wire 120 after full retraction and separation from the particle 500. The speed to retraction may thus be used to control the diameter of the tip of the wire 120. Since the diameter at the tip is the effective diameter of the wire 120 for the next deposition, this controlled necking may be used to deposit particles with a diameter smaller than the bulk wire diameter. In this manner, higher resolution deposition is possible with larger wire diameters. FIGS. 5D-5F illustrate different sized particles 500 that may be deposited using the same wire via control of the wire's retraction speed when depositing the previous particle.

Control of the application of electric current may be used to influence the deposition of particles. Open-loop control of the applied current is enabled via choosing the desired intensity of power along with the duration prior to deposition. The intensity level may be calibrated to achieve a specific voltage or current at a constant contact resistance. However, the contact resistance may vary at each deposition site, as well as vary during the particle deposition itself. Open-loop control may therefore result in the application of too much or too little heat during deposition, and the fusion between particles may be affected. With proper calibration, open-loop control may be used successfully for deposition. In other embodiments of the invention, closed-loop control is used. In closed-loop control, the voltage and current are measured during deposition, and the contact resistance may be calculated according to Equation 2 (i.e., Ohm's Law).

$$R = V/I \qquad \text{Equation 2}$$

Because the contact resistance is calculated dynamically, the power of the applied electric current may be precisely controlled, thus resulting in the exact amount of heat being applied during deposition to achieve the desired deposition parameters and/or particle characteristics. A small AC current on the order of 1 mV to 100 mV may be applied in addition to the DC current of the deposition circuit to determine the impedance response of the system. The impedance may also be measured dynamically and used for feedback control. Closed-loop control may beneficially eliminate failed parts due to incomplete fusion of particles and minimize heat input into the structure during deposition.

In addition to the data that may be measured from the electric circuit of the deposition (i.e., the circuit formed by the baseplate 130 and wire 120 via controller 145 and power supply 140), additional sensors may be utilized to gather complementary data. Temperature measurements of the deposition site on the baseplate 130 or other points on the printed part or apparatus 100 may be measured using contact sensors such as thermocouples or thermistors, and non-contact methods such as infrared (IR) sensors and optical pyrometry. Temperature data may then be used by the system control loop to ensure the desired deposition parameters.

Other sensors may be used to detect the build surface, i.e., the baseplate 130 or the previously deposited layer of particles of the part being printed. Sonar or capacitive response systems may be used to map the surface and detect any areas that are not in specification, allowing for corrective action (e.g., rework such as additional particle deposition in areas having high porosity or missing material). All the data collected for feedback control may also be logged and then analyzed at the network level to develop automatic calibration processes to improve the function of any connected apparatus 100.

To take advantage of the particle-by-particle deposition mechanism in embodiments of the present invention, the design process may be tailored to make use of a voxel system. The 3D rendering module 155 may assign properties to certain sections of the part based the deposition parameters desired using, e.g., computer-aided design (CAD) software. For example, if an internal section of a part should be porous to act as a filter, that section in the CAD design may be selected, and the user may assign values to parameters such as the percent porosity desired. In tandem with the voxel-based extension for the 3D rendering module 155, computer-aided manufacturing software may be utilized to translate the desired voxel properties into the toolpath and deposition parameters required to produce the user's CAD design.

Another example of a voxel-based design is the design of a heat sink. In the CAD design utilized by the 3D rendering module 155, the user may specify properties such as the material and density to direct heat through a specific area of the part. This concept may be used to keep heat-sensitive areas of the same part cool, without having to make the part from multiple pieces or via multiple different depositions. The voxel-based design system may also be leveraged with control of surface textures of either external or internal surfaces. A surface may intentionally be made with a very high surface area to give a part a high-friction surface, a highly radiant surface to cool more effectively, give an electrode higher conductivity, or allow for enhanced adhesion of a surface coating.

To deposit particles in precise locations, the metal wire electrode 120 and baseplate 130 may be positioned with computer-controlled mechanical actuators 110, 135, in a manner similar to that utilized by CAM machine tools. There are many mechanical systems that may accomplish the required motion, using a combination of electric, hydraulic or pneumatic motors and linear actuators, belts, pulleys, lead screws, and other devices. In one embodiment, the metal wire electrode 120 is situated on a gantry system 105 that allows motion in the X and Y directions, as described above. The baseplate electrode 130 moves independently on the Z axis. The feed of metal wire 120 may be controlled by another independent actuator controlling source 125. The timing, duration, and power of the electric current used for deposition are controlled by controller 145. The formation of a structure, controlled by signals from controller 145, may proceed according to the following example. The structure is a simple cube, formed from eight particles each having a diameter of 1 unit.

1. The gantry 105 moves wire 120 to the first position (X0, Y0) in the XY plane.
2. The baseplate 130 moves to a position close to the tip of the metal wire 120 in the Z axis (Z0).
3. Wire 120 is fed from source 125 until it contacts the baseplate 130.
4. Electric current flows through the electrodes (i.e., the baseplate 130 and wire 120), melting the tip of the wire 120 and forming a metal particle on the baseplate 130.
5. The gantry 105 moves the wire 120 to the next position in the XY plane (X1,Y0).
6. Wire 120 is fed to contact the baseplate 130, current is passed, and another particle is formed.
7. The gantry 105 moves the wire 120 in the XY plane and forms two more particles at X1,Y1 and X0,Y1.
8. The baseplate 130 moves one unit away from the metal wire 120 (Z1).
9. The gantry 105 moves the wire 120 to (X0,Y0), wire 120 is fed from source 125 until it makes contact with the particle underneath, and a new particle is formed on top of the previously deposited particle.

10. The gantry 105 moves the wire 120 to each remaining XY position again in order, depositing a particle at each on top of the previous layer.

Like many CAM tools, the metal-based additive manufacturing process in accordance with embodiments of the present invention may be combined with other tools and/or processes in a single machine. Examples of this are a gantry-type machine as described above with a polymer extruder tool and a milling cutter tool attached to the gantry alongside the metal deposition tool. In this manner, hybrid structures may be built from a combination of polymer and metal, using the combination to increase the speed of building the structure, reduce the cost of the structure, or using the material that has the desired properties for that portion of the structure. For example, a part fabricated in accordance with embodiments of the present invention may have a structure that is largely built from a non-conductive polymer but that also features internal printed metallic electric circuits. The milling cutter may be used to machine any precision surfaces required on the structure. This concept may be expanded to include any number of tools in a single machine to perform any operation required for the formation of the required structure.

Multiple parts may be produced in succession in an automated fashion with no human user involvement. After a part is complete, an arm may cross the baseplate 130 and remove the part, depositing it into a collection area. Once the baseplate 130 is cleared of the previous part and the removal arm, the next part may be fabricated.

In some embodiments of the present invention, calculations for the deposition parameters performed by 3D rendering module 155 are based on a static diameter value for the metal wire or polymer filament. However, the diameter of the supplied filament may be variable, as described above, and these variations may cause poor printing performance, jamming/clogging of the wire feeder 115 (e.g., a nozzle), or in severe cases damage to mechanical systems of apparatus 100. It may also be desirable to detect the absence of wire 120 to determine when the source 125 has been exhausted. Additionally, a precise measure of the absolute length of wire 120 consumed may be logged and used to develop algorithms to better project the total wire 120 required and the time to complete a print.

Figure 6:
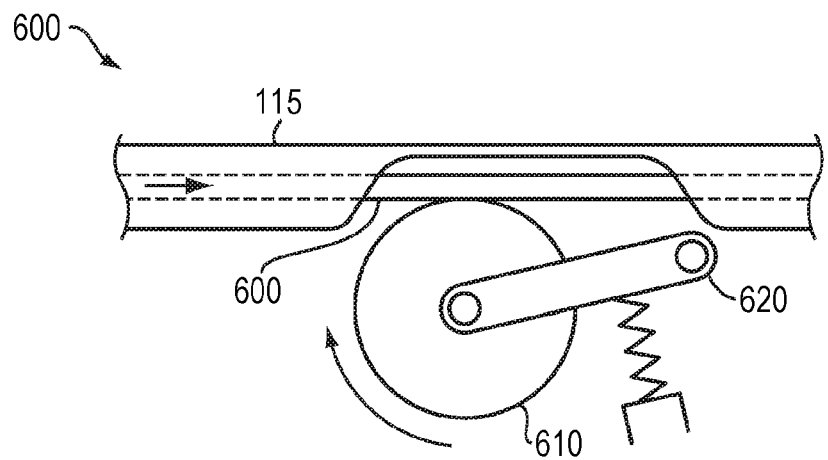
FIG. 6 is a schematic of a mechanical wire-tracking system in accordance with various embodiments of the invention.

In various embodiments of the present invention, in order to sense and track the use of wire 120 (or its absence), the apparatus 100 incorporates a system that includes or consists essentially of either a mechanical wheel that is in contact with the wire 120, or an optical system that has an unimpeded view of the 120. FIG. 6 schematically depicts a mechanical wire-tracking system 600 that includes a wheel 610 that contacts the wire 120 at a point within the wire feeder 115 as the wire 120 is fed from source 125 during printing. The motion of the wire 120 may be recorded by a digital encoder connected to the wheel 610. The amount of wire 120 utilized during a period of time may be calculated from the encoder readout. As shown, the wheel 610 may be connected to a mechanism such as a spring-loaded lever 620 that urges the wheel 610 against the wire 120. In this manner, deflections of the lever 620 may be used to calculate the diameter of the wire 120. Absence of wheel motion or a very small diameter measurement will typically indicate that the source 125 has been emptied of wire 120.

Figure 7:
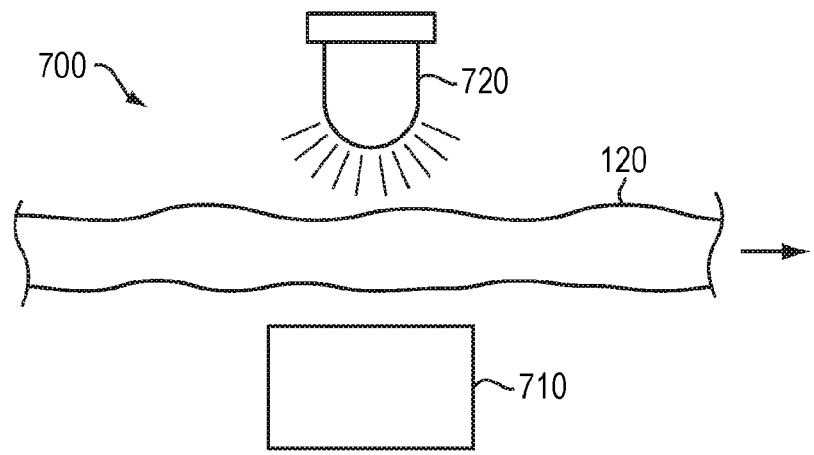
FIG. 7 is a schematic of an optical wire-tracking system in accordance with various embodiments of the invention.

FIG. 7 depicts an optical wire-tracking system 700 that may be incorporated into various embodiments of the present invention. An optical image sensor 710 may be utilized to determine movement in of the wire 120 based on microscopic changes in the wire's surface and therefore be used to measure absolute length of wire 120 utilized during a printing process. A light 720 angled on the backside of the wire 120 facing the sensor 710 may be used to measure the diameter of the wire 120 based on the area of light blocked by the wire 120. Multiple sensors 710 may be used to provide more accurate measurements in multiple axes with respect to the wire 120. Similarly to the wire-tracking system 600, the motion and diameter of the wire 120 may be used to calculate total length of wire utilized, detect when source 125 is out of wire, etc.

Figure 8:
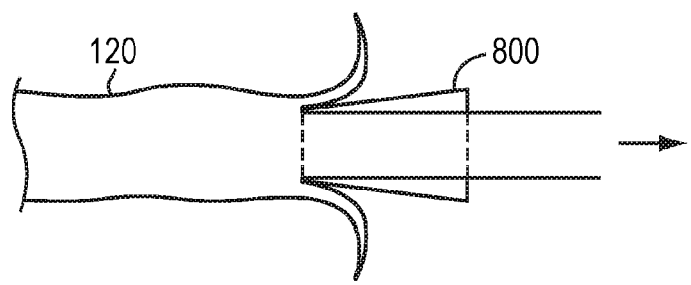
FIG. 8 is a schematic of an anti jamming mechanism in accordance with various embodiments of the invention.

Printers in accordance with embodiments of the present invention may also incorporate an anti jamming mechanism to prevent drastically oversized wire from causing a jam or other damage to the wire feeder (e.g., the nozzle thereof). For example, a ring having an inside diameter matching the maximum allowable wire diameter may be disposed within the wire feeder 115 or between the wire feeder 115 and the source 125. The wire 120 may be passed through the ring, and if it is oversized, the wire may become stuck in the ring or otherwise be unable to pass through the feeder 115 for printing. This condition may be sensed by, e.g., wire-tracking system 600 or 700, and reported to the operator. Additionally, FIG. 8 depicts an embodiment of such a ring 800. As shown, ring 800 may have a sharp edge on the inner diameter so that the wire 120 may be automatically trimmed to the proper diameter as it passes through the ring 800.

Some printed parts, particularly those having high densities and/or variable or complicated geometries, may be difficult to remove from the baseplate 130 after printing. In various embodiments of the invention, a sacrificial structure (or "raft") may be printed on the baseplate 130 before the part and utilized to enable removal of the part from the baseplate 130. In various embodiments, the structure of the raft is selected to facilitate anchoring of the part to the baseplate 130 and enable electrical conductivity between the part (i.e., the wire electrode) and the baseplate 130 while facilitating removal of the raft from the finished part after printing. Furthermore, rafts having the same size and/or shape and/or interior configuration may be utilized for parts having very different geometries, thereby enabling a standardized process for removal of different parts from the baseplate 130—after printing, the raft (and the printed part thereover) is removed from the baseplate 130, and then the raft is removed from the part. In various embodiments, the raft may include, consist essentially of, or consist of, e.g., metal and/or polymer. In various embodiments, the raft is not printed by the apparatus 100 but is provided by other means (e.g., fabricated by another apparatus and affixed (e.g., adhered) to the baseplate 130 prior to printing of a desired part). In various embodiments, the raft includes, consists essentially of, or consists of one or more materials different from that utilized to fabricate a part thereon. For example, wires including, consisting essentially of, or consisting of different metals may be utilized to print the raft and to print one or more parts thereover.

Figure 9A:
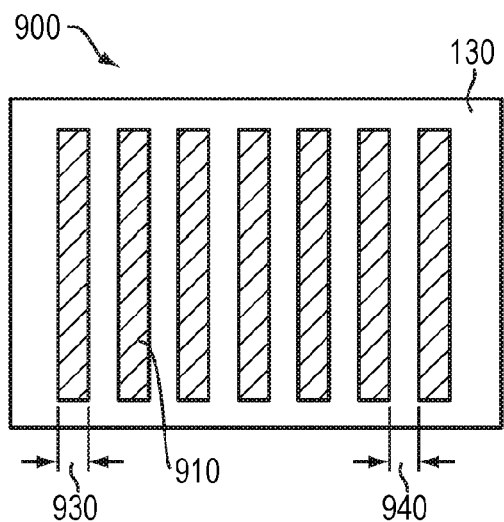
FIGS. 9A and 9B are schematic plan views of sacrificial structures printed between the baseplate and a desired printed part in accordance with various embodiments of the invention.
Figure 9B:
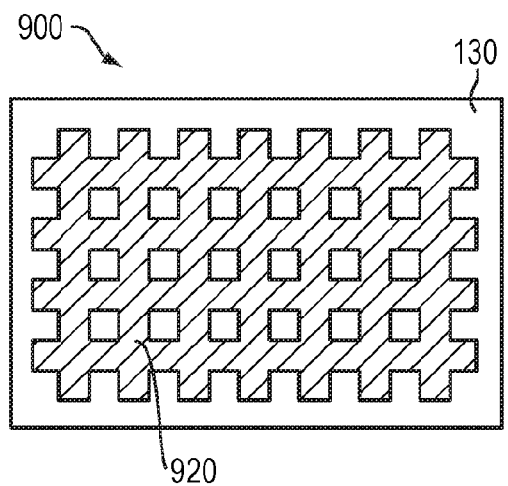

FIGS. 9A and 9B are schematic top views of rafts 900 fabricated in accordance with embodiments of the present invention. As shown, the raft may include or consist essentially of one or more layers of material printed (e.g., using wire 120) over the baseplate 130 before printing of the desired part. In order to facilitate subsequent removal of the raft from the printed part, the raft may be composed of, e.g., a series of stripes 910 or a grid pattern 920 of the printed material, as shown in FIGS. 9A and 9B. That is, in various embodiments, the raft 900 defines one or more openings therethrough that extend between the baseplate 130 and a part printed over the raft 900, rather than the raft 900 being composed of a solid sheet of material. The raft 900 may be printed utilizing a wire 120 that corresponds to the wire 120 (i.e., the same material and/or the same wire diameter and/or deposition conditions) utilized to print the part over the raft 900, or the raft 900 may be printed utilizing a different material, different wire diameter, and/or different deposition conditions (e.g., wire withdrawal rate).

Figure 9C:
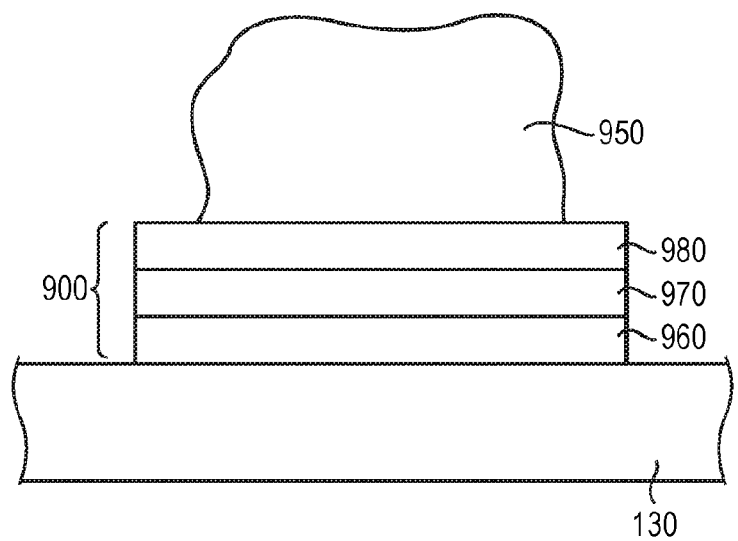
FIG. 9C is a schematic cross-sectional view of a part printed on a sacrificial structure on a baseplate in accordance with various embodiments of the invention.

In various embodiments, the raft 900 is at least partially composed of printed areas having thicknesses 930 with gaps 940 therebetween. The sizes of thicknesses 930 and/or gaps 940 may be selected to control the adhesion between the raft 900 and the printed part and/or the baseplate 130. Instead or in addition, the height (i.e., vertical thickness) of all or a portion of the raft 900 may be selected to facilitate subsequent printing of a part thereover. FIG. 9C depicts a part 950 printed over an exemplary raft 900 composed of one or more bottom layers 960, one or more middle layers 970, and one or more top layers 980. The bottom layer 960 may have a thickness greater than the layer thickness typically utilized for printing parts in order to, e.g., isolate the part from any roughness or unevenness of the surface of the baseplate 130. For example, if printed parts are typically composed of layers having thicknesses of approximately 0.6 mm, then at least the bottom layer 960 of the raft 900 may have a thickness greater than 0.6 mm, e.g., greater than 1 mm, or even thicker. The exemplary raft 900 in FIG. 9C also contains one or more middle layers 970 that typically do not mechanically contact either the baseplate 130 or the part 950. The middle layer(s) 970 may, for example, provide structural stability to the raft 900 while also providing electrical conductivity through the raft 900. The top layer 980 may have a structure designed to control the amount of adhesion between the raft 900 and part 950 printed over the raft. For example, the porosity of top layer 980 and/or the size of gaps 940 of the top layer 980 may be increased to decrease the amount of surface area at the interface (and thus the adhesion) between the raft 900 and the part 950.

Figure 10A:
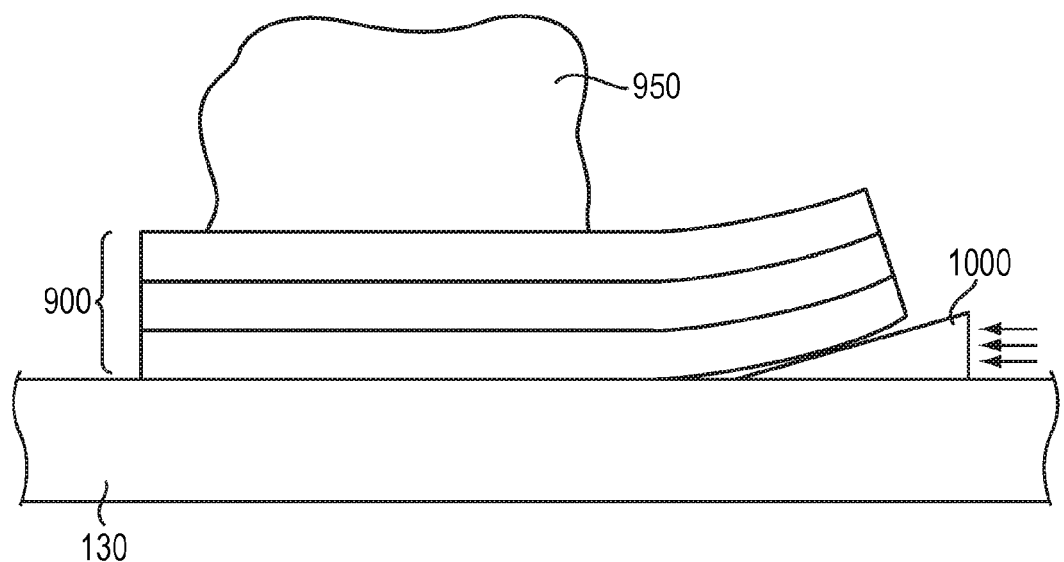
FIG. 10A is a schematic illustration of removal of a sacrificial structure and printed part thereover from a baseplate in accordance with various embodiments of the invention.
Figure 10B:
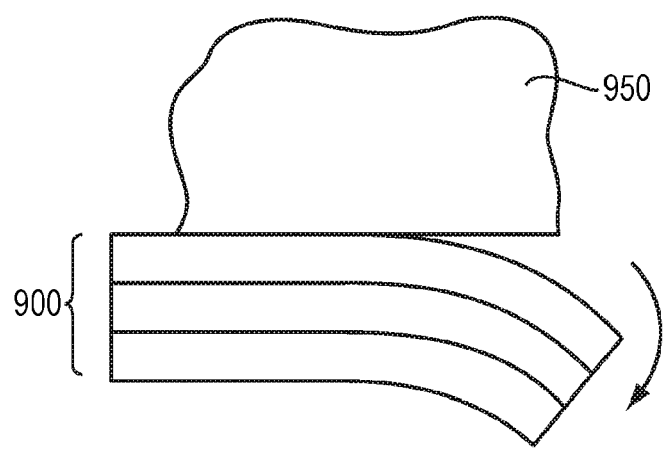
FIG. 10B is a schematic illustration of removal of a sacrificial structure from a printed part in accordance with various embodiments of the invention.

Once the part 950 has been printed as detailed herein, the part 950 and the raft 900 may be separated from the baseplate 130. FIG. 10A illustrates an exemplary embodiment in which a blade 1000 is utilized to separate the raft 900 from the baseplate 130. As shown in FIG. 10B, after separation of the raft 900 from the baseplate 130, the raft may be peeled away from the part 950.

In accordance with various embodiments of the invention, the printing apparatus 100 may be a single "station" along an assembly line of modular automated manufacturing stations in order to leverage the automation capabilities of apparatus 100. For example, a part may be printed utilizing an apparatus 100 and then automatically transferred (via, e.g., a conveyor belt, robotic handler, or similar system) to a finishing station (e.g., rock tumbler, vibration box, bead blasting cabinet, etc.) and thence to a cleaning station for automatic sterilization with UV light, chemicals, etc. The part may then be transferred into, e.g., a plastic wrap station, and then to a packaging station with an automatic labeler that labels the boxed parts as they exit. A parallel assembly line may produce packing material for the printed part. For example, a mold of the printed part may be utilized to shape packaging foam such that it is form-fitted to the finished part. The shaped foam may be fed into the packaging system along with a box in the main assembly line.

In accordance with various embodiments of the invention, wire-tracking systems such as wire-tracking systems 600, 700, as well as rafts (e.g., raft 900) and/or other portions of apparatus 100 may be utilized with wires composed of non-metallic materials (e.g., plastic) and/or to print non-metallic (e.g., plastic) objects.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method for printing at least a portion of a three-dimensional (3D) object adjacent to a support, comprising:
   (a) receiving in computer memory a computational representation of said 3D object;
   (b) subsequent to receiving said computational representation of said 3D object, directing at least one feedstock through a feeder and in contact with said support;
   (c) upon directing said at least one feedstock in contact with said support, using a power supply to flow electrical current through said at least one feedstock and said support while said at least one feedstock is in contact with said support;
   (d) subjecting said at least one feedstock to Joule heating upon flow of electrical current through said at least one feedstock and said support, which Joule heating is sufficient to melt at least a portion of said at least one feedstock; and
   (e) depositing said at least said portion of said at least one feedstock adjacent to said support, wherein a size of said at least said portion of said at least one feedstock is controllable relative to said feedstock during deposition, thereby printing said at least said portion of said 3D object in accordance with said computational representation of said 3D object.

2. The method of claim 1, further comprising repeating (d) and (e) one or more times to deposit additional portion(s) of said at least one feedstock adjacent to said support.

3. The method of claim 1, wherein said feeder comprises an opening that directs said at least one feedstock towards said support.

4. The method of claim 1, wherein said electrical current is subjected to flow through said at least one feedstock and said support using a power supply that is in electrical communication with said at least one feedstock.

5. The method of claim 4, wherein said power supply is in electrical communication with said at least one feedstock through said feeder, and wherein said power supply is in electrical communication with said support.

6. The method of claim 1, further comprising, subsequent to (e), directing an additional feedstock through said feeder, subjecting said additional feedstock to Joule heating and depositing at least a portion of said additional feedstock adjacent to said support or adjacent to said at least said portion of said at least one feedstock.

7. The method of claim 1, wherein in (d), said Joule heating is sufficient to melt only said portion of said at least one feedstock.

8. The method of claim 1, wherein said at least said portion of said at least one feedstock is deposited adjacent to a previously deposited portion of said at least one feedstock or another feedstock.

9. The method of claim 1, wherein in (e), said at least said portion of said at least one feedstock is deposited in a presence of a gas that (i) reduces or substantially prevents oxidation of said at least said portion of said at least one feedstock, and/or (ii) increases a cooling rate of said at least said portion of said at least one feedstock.

10. The method of claim 1, further comprising, subsequent to (e), changing a relative position of said at least one feedstock with respect to said support.

11. The method of claim 10, further comprising depositing at least another portion of said at least one feedstock adjacent to said support or adjacent to said at least said portion of said at least one feedstock upon subjecting said at least one feedstock to Joule heating.

12. The method of claim 1, wherein said at least one feedstock comprises one or more metals.

13. The method of claim 1, wherein said at least one feedstock comprises a plurality of feedstocks, and wherein said plurality of feedstocks comprises a plurality of different metals.

14. The method of claim 1, further comprising controlling a porosity of said at least said portion of said 3D object by at least one of (i) altering a spacing between adjoining contact points between said at least one feedstock and said support or said at least said portion of said 3D object, (ii) altering a magnitude of said current applied between said at least one feedstock and said support, and (iii) altering an amount of said at least one feedstock that is directed towards the support.

15. The method of claim 1, further comprising, in (a), storing a computational representation of said 3D object, extracting sets of data corresponding to successive voxels or layers from said computational representation, and performing (b)-(e) in accordance with said data.

16. The method of claim 1, further comprising selecting a size of said at least said portion of said 3D object by controlling a speed of retraction of said at least one feedstock.

17. The method of claim 1, further comprising removing an outer portion of said at least one feedstock before said at least said portion of said at least one feedstock is melted to form said at least said portion of said 3D object.

18. The method of claim 1, further comprising using feedback control to (i) measure a deposition parameter and/or characteristic of said at least said portion of said at least one feedstock, and (ii) printing said at least said portion of said 3D object in accordance with said deposition parameter and/or characteristic measured in (i).

19. The method of claim 18, wherein said feedback control is used to measure one or more of (i) contact resistance, (ii) voltage, (iii) current, (iv) temperature of said support, (v) temperature of said at least said portion of said at least one feedstock, (vi) temperature of said at least said portion of said 3D object, (vii) amount of said at least said portion of said at least one feedstock, (viii) dimensions of said at least said portion of said at least one feedstock, (ix) movement of said at least said portion of said at least one feedstock, (x) damage during deposition, (xi) speed of deposition, (xii) heat during deposition, (xiii) spacing among individual portions of said at least said portion of said 3D object, (xiv) spacing between said at least said portion of said at least one feedstock and said support, (xv) spacing between said at least said portion of said at least one feedstock and said at least said portion of said 3D object, and (xvi) porosity of said at least said portion of said 3D object.

20. The method of claim 1, wherein during use, said at least said portion of said 3D object is formed in response to heat arising from, at least in part, contact resistance between a tip of said at least one feedstock and said support.

21. The method of claim 1, further comprising forming a sacrificial raft structure prior to printing said at least said portion of said 3D object, which sacrificial raft structure (i) anchors said at least said portion of said 3D object to said support and (ii) permits removal of said at least said portion of said 3D object from said support.

22. The method of claim 21, further comprising, subsequent to printing said at least said portion of said 3D object, (i) removing said sacrificial raft structure from said support, and (ii) separating said sacrificial raft structure from said at least said portion of said 3D object.

23. The method of claim 1, wherein said support is a base plate.

* * * * *

UNITED STATES PATENT AND TRADEMARK OFFICE
CERTIFICATE OF CORRECTION

PATENT NO. : 9,956,640 B2
APPLICATION NO. : 15/619401
DATED : May 1, 2018
INVENTOR(S) : Paul Burke et al.

It is certified that error appears in the above-identified patent and that said Letters Patent is hereby corrected as shown below:

On the Title Page

Column 1, Item (73), Assignee:
Replace "DIGITAL ALLOYS INCORPORATION" with --DIGITAL ALLOYS INCORPORATED--

Signed and Sealed this
Twenty-eighth Day of August, 2018

Andrei Iancu
*Director of the United States Patent and Trademark Office*